United States Patent [19]

(12) United States Patent
Anders et al.

(10) Patent No.: US 12,280,450 B2
(45) Date of Patent: Apr. 22, 2025

(54) INTEGRATED COMPRESSED AIR COOLING FOR WELDING SYSTEMS

(71) Applicant: Illinois Tool Works Inc., Glenview, IL (US)

(72) Inventors: Adam E. Anders, Oshkosh, WI (US); Daniel J. Mortensen, Greenville, WI (US); Caleb M. Rosera, Menasha, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 952 days.

(21) Appl. No.: 17/358,388

(22) Filed: Jun. 25, 2021

(65) Prior Publication Data

US 2022/0032386 A1 Feb. 3, 2022

Related U.S. Application Data

(60) Provisional application No. 63/059,732, filed on Jul. 31, 2020.

(51) Int. Cl.
*B23K 3/08* (2006.01)
(52) U.S. Cl.
CPC .................................. *B23K 3/085* (2013.01)
(58) Field of Classification Search
CPC .... B23K 9/325; B23K 37/003; B23K 9/1006; B23K 3/085

(Continued)

(56) References Cited

U.S. PATENT DOCUMENTS 3,470,345 A * 9/1969 Vaillancourt .......... B23K 9/013
219/70
4,260,867 A * 4/1981 Coughlin ............. B23K 9/1336
219/69.1

(Continued)

FOREIGN PATENT DOCUMENTS

CN 106001877 10/2016
EP 3627983 3/2020

(Continued)

OTHER PUBLICATIONS

European Examination report Appln No. 21188134.8 dated Oct. 12, 2023.

(Continued)

*Primary Examiner* — Eric S Stapleton
(74) *Attorney, Agent, or Firm* — McAndrews, Held & Malloy, Ltd.

(57) ABSTRACT

Systems and methods are disclosed for integrated compressed air cooling for welding systems. In particular, the disclosed systems and methods may employ compressed air to implement one or more welding processes (e.g., a gouging or cutting processes), with the compressed air being conveyed through such welding systems. In some examples, the compressed air is routed within the welding system to provide cooling for one or more components therein. For instance, components such as power conversion circuitry may heat up during the welding process. Routing compressed air to or near the components will introduce relatively cool air to the environment. As the passing compressed air heats in response to interaction with the heated components, heat is drawn from the components and/or the nearby environment.

20 Claims, 3 Drawing Sheets

(58) Field of Classification Search
USPC .......................................................... 219/531
See application file for complete search history.

(56) References Cited

U.S. PATENT DOCUMENTS

| | | | | |
|---|---|---|---|---|
| 10,610,983 B2* | 4/2020 | Melius | ................... | B23K 10/00 |
| 10,897,807 B2* | 1/2021 | Raymond | ............. | B23K 37/003 |
| 2003/0155339 A1* | 8/2003 | Gitter | ...................... | F02B 63/06 |
| | | | | 219/136 |
| 2005/0155959 A1* | 7/2005 | Bender | ................ | B23K 9/1006 |
| | | | | 219/133 |
| 2009/0159572 A1* | 6/2009 | Salsich | ................ | B23K 9/1006 |
| | | | | 219/121.36 |
| 2009/0218327 A1* | 9/2009 | Beeson | ..................... | B60P 3/14 |
| | | | | 219/133 |
| 2014/0367366 A1* | 12/2014 | Bertram | .................. | F04B 39/16 |
| | | | | 219/74 |
| 2016/0105935 A1* | 4/2016 | Jones | ....................... | B23K 9/02 |
| | | | | 219/601 |
| 2018/0029154 A1* | 2/2018 | Rajagopalan | ........ | B23K 9/0286 |
| 2018/0354052 A1* | 12/2018 | Schartner | ................. | B23K 9/32 |

FOREIGN PATENT DOCUMENTS

| | | |
|---|---|---|
| JP | S54136547 | 10/1979 |
| KR | 20130033760 | 4/2013 |
| KR | 20130141062 | 12/2013 |

OTHER PUBLICATIONS

European Office Communication with extended Search Report Appln No. 21188134.8 dated Dec. 21, 2021.

* cited by examiner

INTEGRATED COMPRESSED AIR COOLING FOR WELDING SYSTEMS

CROSS REFERENCE TO RELATED APPLICATIONS

This application is a Non-Provisional Patent Application of U.S. Provisional Patent Application No. 63/059,732 entitled "Integrated Compressed Air Cooling For Welding Systems" filed Jul. 31, 2020, which is herein incorporated by reference in its entirety.

BACKGROUND

Welding is a process that has increasingly become ubiquitous in all industries. Conventional systems and methods for short circuit welding processes, such as welding, brazing, adhesive bonding, and/or other joining operations, require substantial investments in equipment, such as processing, displays, practice workpieces, welding tool(s), sensor(s), and/or other equipment.

Conventional welding systems and processes often require high power outputs, which may generate heat that compromises performance of the welding systems. In this regard, the welding systems may benefit from systems and methods that provide cooling for such components.

SUMMARY

The present disclosure is directed to systems and methods with integrated compressed air cooling, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

DRAWINGS

Figure 1:
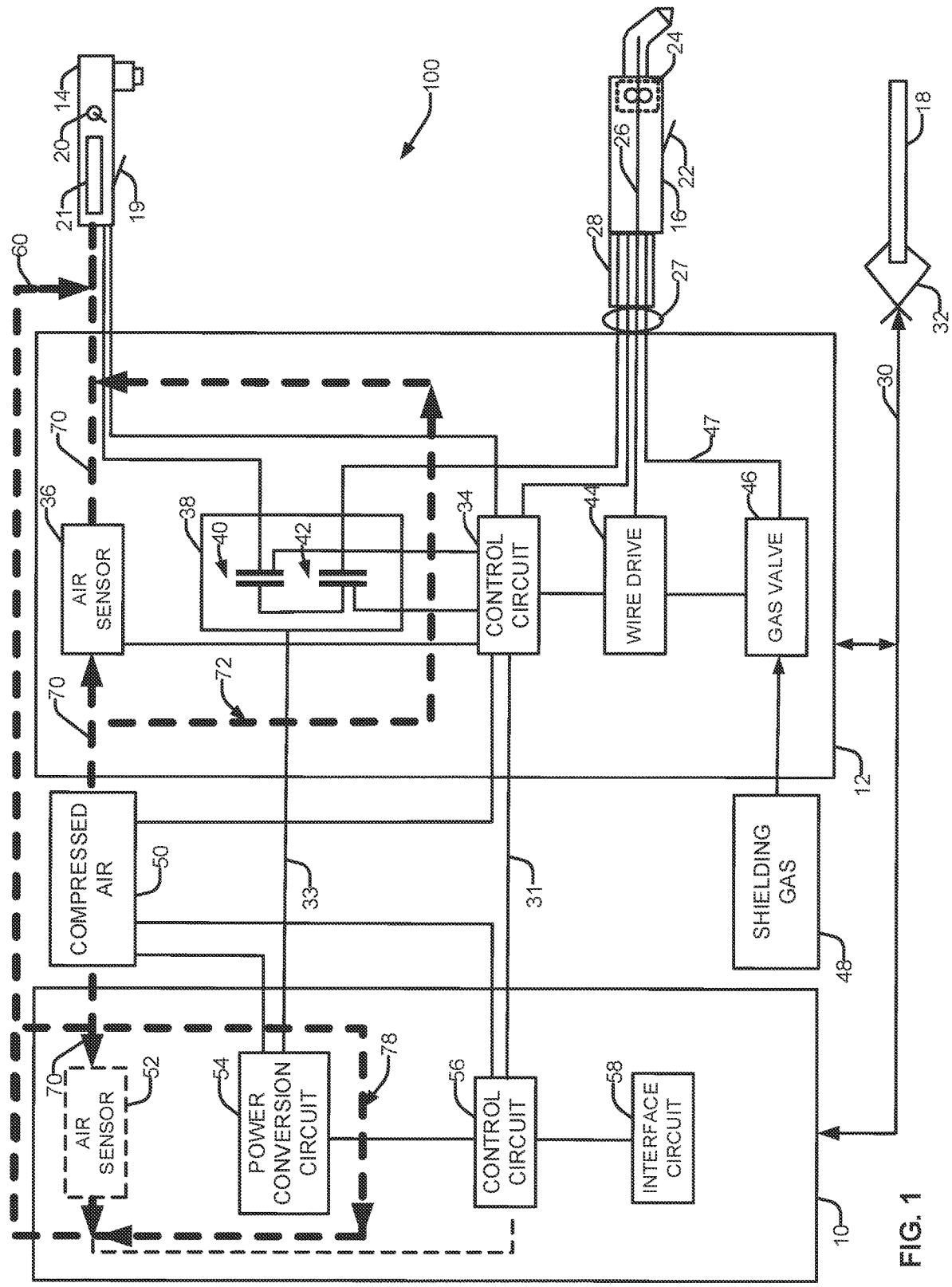
FIG. 1 illustrates an example welding type system with integrated compressed air cooling, in accordance with aspects of this disclosure.
Figure 3:
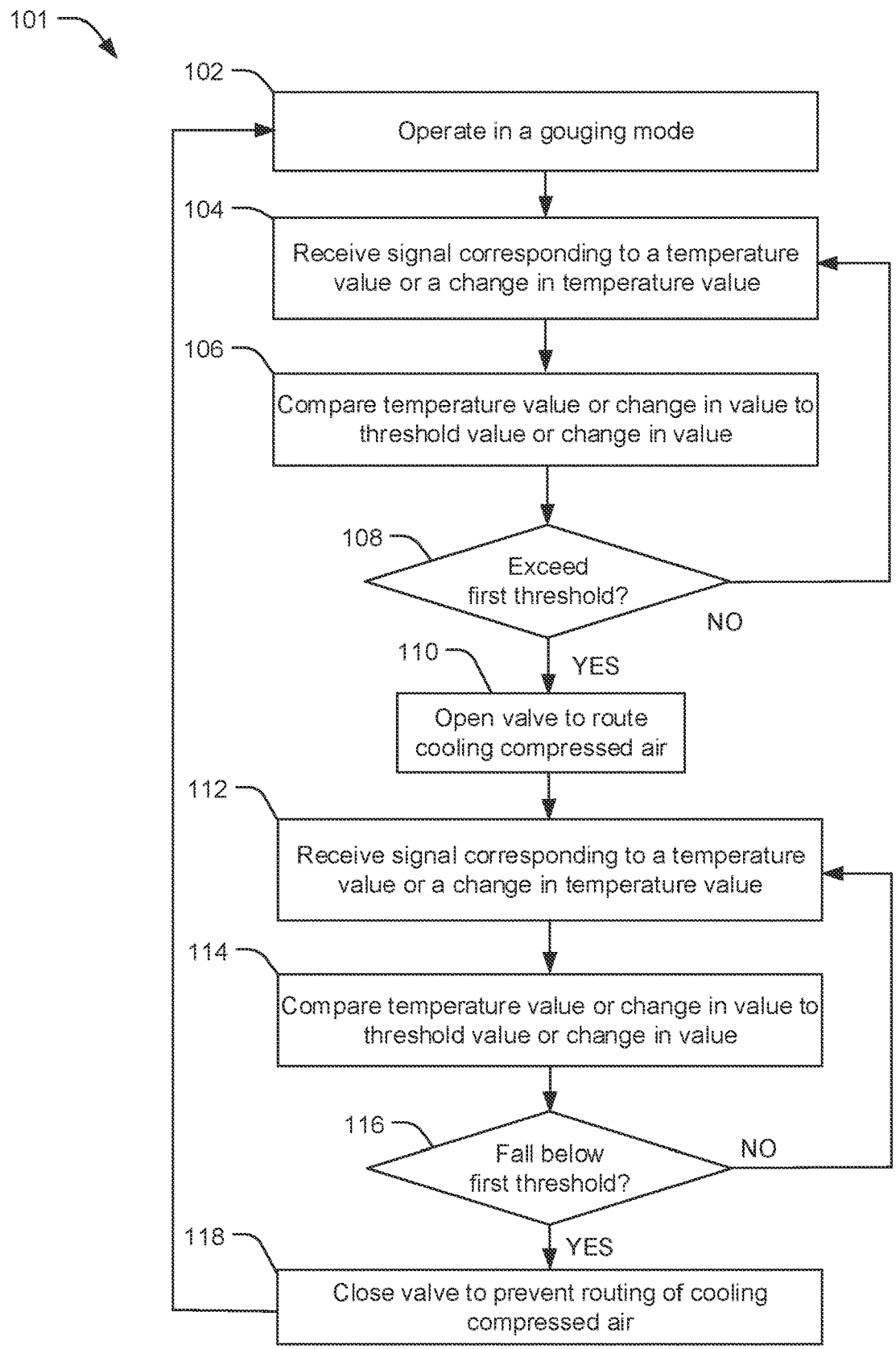

FIG. 3 provides a flowchart representative of example machine-readable instructions which may be executed by the example system of FIG. 1 to provide compressed air cooling in a welding type system, in accordance with aspects of this disclosure.

The figures are not necessarily to scale. Where appropriate, similar or identical reference numbers are used to refer to similar or identical components.

DETAILED DESCRIPTION

The present disclosure is directed to integrated compressed air cooling for welding systems. In particular, the disclosed systems and methods may employ compressed air to implement one or more welding processes (e.g., a gouging or cutting processes), with the compressed air being conveyed through such welding systems. In some examples, the compressed air is routed within the welding system to provide cooling for one or more components therein. For instance, components such as power conversion circuitry may heat up during the welding process. Routing compressed air near the components will introduce relatively cool air to the environment. As the passing compressed air heats in response to interaction with the heated components, heat is drawn from the components and/or the nearby environment. As a result, the components may operate more efficiently, in a greater variety of environments, with an extended useful life.

Welding power supplies and/or welding wire feeders are configured to operate wire welding processes (e.g., gas metal arc welding (GMAW), flux-cored arc welding (FCAW), shielded metal arc welding (SMAW)) as well as gouging (e.g., Carbon Arc Cutting-Air (CAC-A)). In an example, a valve can be integrated with a gouging torch, which can be adjusted to allow or arrest the flow of compressed air to the gouging torch during a gouging operation. In some examples, the compressed air is routed through a connected welding system (e.g., a welding power source, a welding wire feeder) as the compressed air is conveyed to the gouging torch. The compressed air is typically cooler than components or air within a housing of the welding system. Thus, the compressed air may be channeled through the welding system to introduce cooling to the components and/or housing of the welding system, as well as move heated air away from the components and/or housing as the air is conveyed to the gouging torch.

Typical gouging processes operate with greater electrical current then a typical welding applications. Welding systems configured to perform gouging processes may employ a higher amperage capacity connection point (e.g., couplings, studs, outlets, etc.), conduction paths (e.g., wiring, cabling, a bus, etc.) and electrical components (e.g., control circuitry, power conversion circuitry, etc.). Such higher amperage capacity components increase both cost and weight of the welding system.

Compressed air is typically employed for gouging applications, such that if the compressed air were routed through the welding system it could be utilized to provide cooling for critical and/or heat sensitive components, which may allow for a lighter, more robust, and more cost-effective system design.

As compressed air is a feature of gouging applications, the structure by which the compressed air is conveyed can be rerouted and/or extended within the welding system while still supplying the gouge torch with the necessary amount of compressed air. For instance, the structure can include channels, conduits and/or tubing (e.g., flexible, rigid, or a combination of both), which may be arranged near a component, be designed to pass through a component, or cool a first element which provides secondary cooling (e.g., a heat sink, fan, etc.).

In some examples the channels or conduits are constructed of a conductive material that readily draws heat from the components (e.g., a metal, semiconductor, etc.). In some examples, the channels or conduits are encased in a medium (e.g., a fluid, which may be static or circulating) which enhances the cooling effect from the flow of compressed air.

In some examples, the channels or conduits are constructed of multiple channels or conduits, such that one or more of the cooling channels may be open and/or one or more of the cooling channels may be closed. One or more valves may be included to open and/or close a particular cooling channel, which may be activated automatically (e.g., in response to a sensor input and/or a control signal) and/or in response to a user input. This technique can focus cooling on particular components (e.g., power conversion circuitry), direct cooling at different locations about the components (e.g., at a first or second side of the component, between two or more components, etc.), and/or block the cooling channels such that compressed air is conveyed directly to the gouging torch.

In some examples, a control circuit may identify if a particular component is in use and/or if heat at that component (and/or at a given location within the housing) has exceeded a threshold temperature level. For example, a particular operation may be being performed (e.g., gouging) as well as an auxiliary function (e.g., battery charging, etc.), such that the control circuitry can operate the valves to direct compressed air to components and/or circuitry associated with the active operations. Further, one or more temperature sensors may be arranged at a component or given location in the housing. In response to a sensor measurement exceeding a threshold temperature value (e.g., one or more threshold temperature values), the control circuitry can operate the valves to direct compressed air to the associated component or location. Further, if the temperature value drops below the threshold temperature value (e.g., or another threshold temperature value), the control circuitry can operate the valves to direct compressed air away from the component or location.

Advantageously, the discloses systems and methods provide additional convenience over conventional systems, as a typical gouging torch has an electrical connection and a compressed air connection, thus having both connections at the welding system provides a convenient connection point, saving set up time. Weight of the system would also decrease, as the added cooling allows for the use of lighter components, resulting in a product that is easier for the operator to transport and use. Further, the added cooling allows for more cost effective components and a lesser need for replacement components, resulting in lower material and maintenance costs.

In disclosed examples, a welding system includes one or more channels within the welding system to convey compressed air from a compressed air source, a compressed air outlet to provide compressed air through the one or more channels to a gouging torch, and a cooling pathway to route compressed air through the one or more channels to a component within the welding system, wherein conveyance of the compressed air draws heat from the component.

In some examples, the one or more channels comprise a conductive material. In examples, the conductive material is one of a metal or a semiconductor. In some examples, the one or more channels comprise one or more of a flexible conduit or a rigid conduit. In examples, one or more valves selectively control conveyance of the compressed air to the one or more channels.

In some examples, one or more temperature sensors monitor temperature of the component. In examples, the component comprises one or more of a power conversion circuitry or a control circuitry. In some examples, the welding system comprises a welding power source or a wire feeder.

In examples, the welding system is configured to operate in a gouging mode or an arc welding mode, the compressed air source configured to activate in the gouging mode and deactivate in the arc welding mode. In some examples, the compressed air source is an air compressor. In examples, the one or more channels are located within a housing of the welding system.

In disclosed examples, a wire feeder includes one or more channels within the wire feeder to convey compressed air from a compressed air source, a compressed air outlet to provide compressed air through the one or more channels to a gouging torch, a cooling pathway to route compressed air through the one or more channels to a component within the wire feeder, wherein conveyance of the compressed air draws heat from the component, and one or more valves to selectively control conveyance of the compressed air to the one or more channels.

In some examples, one or more sensors monitor temperature of the component. In examples, a control circuitry is configured to receive signals from the one or more sensors corresponding to a temperature of the component, control the one or more valves to open to route compressed air to the component when the temperature has exceeded a first threshold temperature value, and control the one or more valves to close to prevent compressed air being routed to the component when the temperature is below the first threshold temperature value.

In examples, the one or more sensors are located on or near the component within the wire feeder. In examples, the torch includes a selector to control flow of compressed air to the torch. In some examples, a welding cable connects the torch to the wire feeder, the welding cable to convey one or more of arc welding power, gouging power, compressed air, electrode wire, shielding gas, or control signals.

The term "welding-type system," as used herein, includes any device capable of supplying power suitable for welding, plasma cutting, induction heating, Carbon Arc Cutting-Air (e.g., CAC-A, or gouging), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding).

As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith. The term can include engine driven power supplies, energy storage devices, and/or circuitry and/or connections to draw power from a variety of external power sources.

As used herein, the term "wire feeder" includes the motor or mechanism that drives the wire, the mounting for the wire, and controls related thereto, and associated hardware and software.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to implement a welding process.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), Field Programmable Gate Arrays (FPGAs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "energy storage device" is any device that stores energy, such as, for example, a battery, a supercapacitor, etc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, plasma cutting, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the terms "first" and "second" may be used to enumerate different components or elements of the same type, and do not necessarily imply any particular order.

FIG. 1 illustrates an example welding system 100 with integrated compressed air cooling. In some examples, the welding system 100 employs a compressed air source 50 (e.g., an air compressor) to output compressed air 70. The compressed air 70 is used to implement one or more welding processes (e.g., a gouging or cutting processes). In some examples, the compressed air 70 conveyed through such welding systems to a gouging torch 14, with some or all of the compressed air 70 routed within the welding system (e.g., a power source 10 and/or a wire feeder 12) to provide cooling for one or more components therein (e.g., power conversion circuitry, etc.). Routing compressed air 70 near the components will introduce relatively cool air to the component and/or immediate environment, and as the passing compressed air heats in response to interaction with the heated components, heat is drawn from the components and/or the environment.

As shown in the welding system of FIG. 1, the power supply 10 and the wire feeder 12 are coupled via one or more conductors or conduits to share power, data, and/or other consumables. In the illustrated example, the power supply 10 may be separate from the wire feeder 12, such that the wire feeder may be positioned at some distance from the power supply near a welding location. However, in some examples the wire feeder may be integrated with the power supply 10. In examples in which the wire feeder 12 is separate from the power supply 10, terminals are typically provided on the power supply and on the wire feeder 12 to allow the conductors or conduits to be coupled to the systems so as to allow for power and/or gas to be provided to the wire feeder 12 and/or a tool from the power supply 10, and to allow data to be exchanged between the two devices (e.g., between control circuitry 34, 56). In some examples, a cable 33 can provide power from the power supply 10 to the wire feeder 12, and a cable 31 can provide data to or from the wire feeder 12. In some examples, a single cable can be used to provide both power and data between the power supply 10 and the wire feeder 12.

The system 100 is configured to provide wire, power, compressed air, and/or shielding gas to one or more welding tools, such as gouging torch 14 and/or welding torch 16. The welding torch 16 may be one of many different types, and may allow for the feed of a welding wire 26 (e.g., an electrode wire) from a wire drive 44 and/or gas from a shielding gas source 48 via a gas valve 46 and tube 47 to the welding torch 16. The welding torch 16 can then travel to a location adjacent to a workpiece 18 to perform a welding operation. The welding torch 16 may be activated by a trigger 22, which can send signals to the control circuitry 34 to activate wire drive 44 and/or supplemental wire feeder 24. A second conductor 30 is run to the welding workpiece 18 so as to complete an electrical circuit between the power supply 10 and/or the wire feeder 12 and the workpiece 18, such as via a clamp 32.

The gouging torch 14 includes a selector 20 (e.g., a mechanical and/or electronic switch) to control flow of air, such as from compressed air source 50. Although illustrated as located on torch 14, the selector 20 (and/or valve 21) may be located on the wire feeder 12, the power supply 10, and/or along the length of the tubing that provides air flow to the torch 14. The compressed air source 50 (e.g., an air compressor) may be connected to one or more of the control circuitry 34, 56, and may draw power from the power conversion circuit 54 and/or an alternative power source (e.g., an energy storage device, mains power, etc.).

The control circuit 56 is coupled to power conversion circuit 54. This power conversion circuit 54 is adapted to create the output power, such as pulsed waveforms applied to the welding wire 26 at the tool 16. Various power conversion circuits may be employed, including choppers, boost circuit, buck circuit, inverters, converters, and so forth. The power conversion circuit 54 is coupled to a source of electrical power, such that the power applied to the power conversion circuit 54 may originate in the power grid, although other sources of power may also be used, such as power generated by an engine-driven generator, batteries, fuel cells or other alternative sources. The power supply illustrated in FIG. 1 may also include an interface circuit 58 configured to allow the control circuit 56 to exchange signals with the wire feeder 12, the torches 14, 16, and/or a remote control device (e.g., via wired connection and/or wirelessly).

In order to activate a gouging operation, the operator employs selector 20 to indicate a gouging mode, such that air flow from the compressed air source 50 to the torch 14 (e.g., via air sensor 36), drawing power from power conversion circuitry 38 (and/or power conversion circuitry 54). In disclosed examples, as the selector 20 is employed to indicate a gouging mode, the selector 20 opens a valve 21 to allow air to flow from the compressed air source 50 to the torch 14.

Air sensor 36 measures the air flow (e.g., a change in the air flow or pressure, and/or an absolute air flow or pressure value), and the information is transmitted to the control circuitry 34 (and/or control circuitry 56), which determines activation of a gouging mode based on the selection. In some additional or alternative examples, the selector 20 includes one or more circuits, such as a sensor and/or transceiver, configured to transmit a signal to the control circuitry directly. Although illustrated as located within the wire feeder 12, additional or alternative air sensors may be located in the torch 14 body and/or along a length of the tube bringing air to the torch 14.

Upon determining the selection of a gouging mode, the control circuitry 34 controls a switch 40 (e.g., a contactor, a switch, a high amperage relay, solid-state device, an interlock, etc.) to close a circuit to provide power from power conversion circuitry 38 to the torch 14. Additionally, the control circuitry 34 controls switch 42 to open a circuit to prevent power from flowing to the welding torch 16. In examples, if a gouging process has been initiated, but the torch 14 has not been activated (e.g., the selector 20 has not been activated, etc.) within a given period of time, the control circuitry 34 may automatically terminate the gouging mode. This may include opening the switch 40, closing one or more valves of compressed air, and/or activating a welding mode. In some additional or alternative examples, the gouging torch 14 includes a trigger 19, which can be employed to activate the torch 14. Selection and activation of a gouging mode has been disclosed in U.S. patent application Ser. No. 16/942,447, entitled "Systems And Methods For Automatic Gouge Torch Activation", which is incorporated herein by reference in its entirety.

In a gouging process, compressed air 70 is output from the compressed air source 50 to the gouging torch 14. As gouging processes operate with greater electrical current then a typical welding applications, components and circuits to perform gouging processes may employ high amperage capacity connection point, conduction paths, and/or electrical components.

In the example of FIG. 1, compressed air 70 output from the compressed air source 50 to torch 14 for gouging applications may be partially or completely routed through an alternative pathway or cooling channel 72 within the wire feeder 12 to provide cooling for critical and/or heat sensitive components, such as power conversion circuitry 38. In some examples, the cooling channel 72 is designed to receive compressed air whenever the welding system 100 is operating in a gouging mode. In some examples, the cooling channel 72 may be selectively blocked (e.g., via a valve), such that compressed air is conveyed directly to the gouging torch 14.

For instance, the cooling channel 72 can include one or more types of conduit, such as a flexible tube, a rigid tube, or a combination of both. The cooling channel 72 may be arranged near the power conversion circuitry 38, be designed to pass through the power conversion circuitry 38 (e.g., a substrate, a gap in a PCB, between switches 40, 42, etc.), or pass through one or more heat sinks 75 (e.g., via a conductive tube) and/or cooling fluid from a fan, is the cooling channel 72 and/or the heat sink(s) 75 being cooled by the conveyed compressed air, then transferring cooling (e.g., through conduction, convection) to the power conversion circuitry 38. In some examples, air can be directed to flow towards and/or near one or more heat sinks 75 (e.g., one or more fins), and/or heat producing components (e.g., circuitry), such as by a nozzle or tube comprised of and/or extending from the cooling channel 72, for instance. Thus, the compressed air 70 can be rerouted and/or extended within the wire feeder 12 while still supplying the gouge torch 14 with the necessary amount of compressed air.

In an additional or alternative example, compressed air 70 may be routed from the compressed air source 50 through the power supply 10. The power supply 10 may include an air sensor 52, where the flow rate and/or pressure would be detected. The compressed air 70 can then be conveyed to the torch 14 via alternative tubing 60. As shown, compressed air may be partially or completely routed through an alternative pathway or cooling conduit 78 within the power supply 10 to provide cooling for critical and/or heat sensitive components, such as power conversion circuit 54. In some examples, the cooling conduit 78 is designed to receive compressed air whenever the welding system 100 is operating in a gouging mode and compressed air is being provided to the torch 14 via the power supply 10. In some examples, the cooling conduit 78 may be selectively blocked (e.g., via a valve), such that compressed air is conveyed directly to the gouging torch 14 via alternative tubing 60.

Compressed air 70 is not typically used for arc welding processes. However, if compressed air 70 is being used by an auxiliary system associated with the welding system 100, the cooling systems and methods disclosed herein may be employed without the gouging mode being activated.

Figure 2:
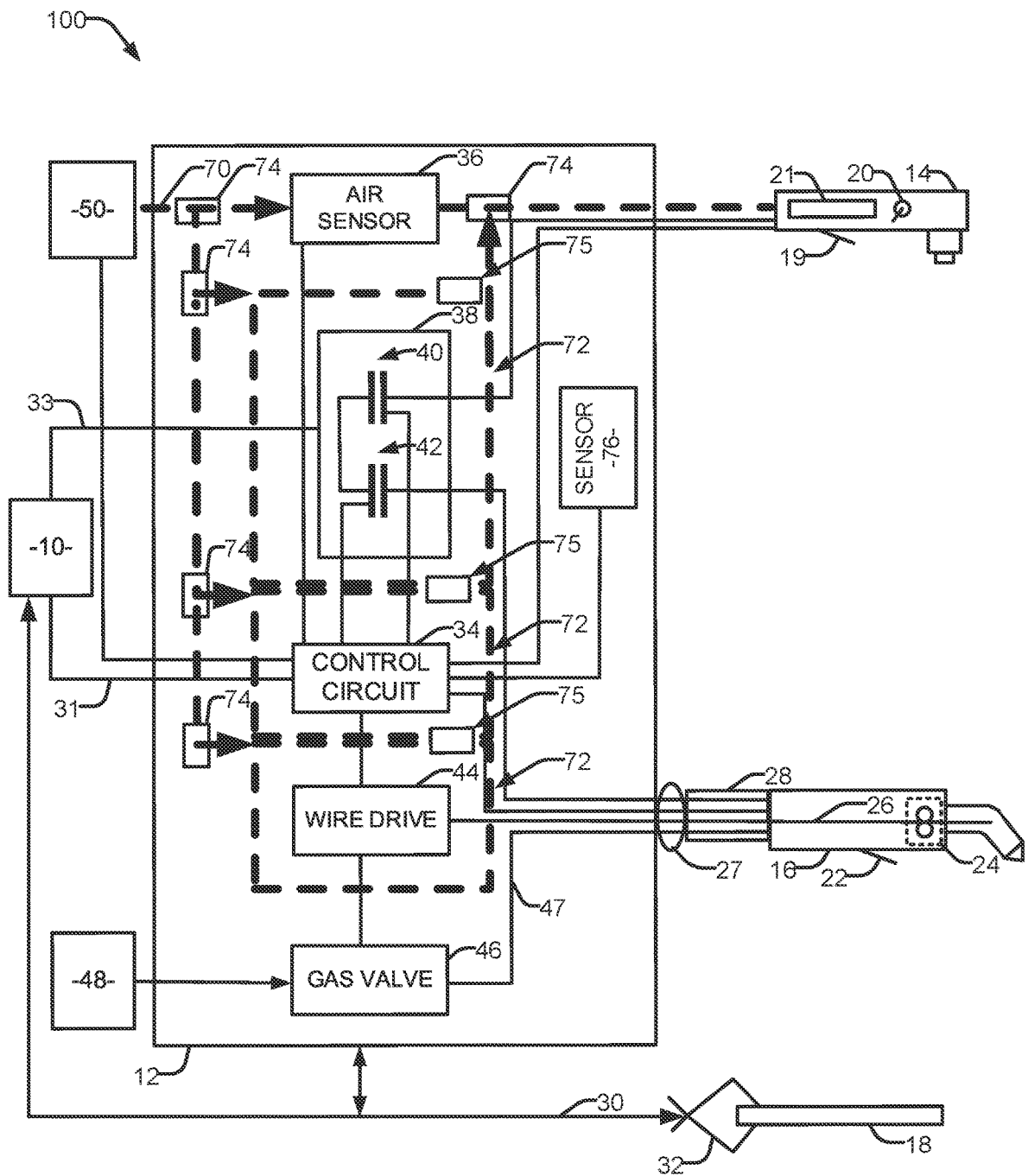
FIG. 2 illustrates another example welding type system with integrated compressed air cooling, in accordance with aspects of this disclosure.

FIG. 2 illustrates another example wire feeder 12 providing multiple cooling channels 72. In the example of FIG. 2, compressed air 70 output to torch 14 for gouging applications may be routed through the wire feeder 12 to provide cooling for critical and/or heat sensitive components, such as power conversion circuitry 38, control circuitry 34, and/or wire drive 44 and associated components, as a list of non-limiting examples. For example, a series of couplers and/or valves 74 may control the path of the compressed airflow through the wire feeder 12. In this manner, cooling channels 72 may be selected to direct cooling to one or more specific components or circuits, as well as provide different cooling profiles. For instance, a cooling channel 72 may encircle a component, thereby drawing heat from multiple surfaces of the component, as shown in FIG. 2.

In some examples, one or more of the multiple cooling channels 72 may be open and/or one or more of the multiple cooling channels 72 may be closed. The valves 74 may be controlled to open and/or close a particular cooling channel, which may be activated automatically (e.g., in response to an input from a sensor 76 and/or a control signal from control circuitry 34) and/or in response to a user input (from a user interface). This technique can focus cooling on particular components (e.g., power conversion circuitry 38), and/or direct cooling at different locations about the components (e.g., at a first or second side of the component, between two or more components, etc.).

In some examples, the control circuitry 34 may identify if a particular component is in use and/or if heat at that component (and/or at a given location within the housing) has exceeded a threshold temperature level. For example, a particular operation may be being performed (e.g., gouging) as well as an auxiliary function (e.g., battery charging, etc.), such that the control circuitry 34 can operate the valves 74 to direct compressed air to components and/or circuitry associated with the active operations. In the example of a gouging operation, power conversion circuitry 38 and control circuitry 34 will be providing power and control, respectively, and the cooling channels 72 corresponding to these components may be open. However, the wire drive 44 will not be in use, so cooling of this component may be blocked.

In some examples, the sensor(s) 76 may be a temperature sensors (e.g., a thermistor, etc.) arranged at one or more of the components and/or at a given location in the housing. In response to a sensor measurement exceeding a threshold temperature value (e.g., one or more threshold temperature values), the control circuitry 34 can operate the valves 74 to direct compressed air to the associated component or location. For example, a first component (e.g., power conversion circuitry 38) may have a higher temperature threshold than a second component (e.g., control circuitry 34). Further, if the temperature value drops below the threshold temperature value (e.g., or another threshold temperature value), the control circuitry 34 can operate the valves 74 to direct compressed air away from the component or location.

Additionally or alternatively, the control circuitry 34 and/or control circuitry 56 adjusts one or more operational characteristics to optimize cooling from the compressed air. For example, data corresponding to component usage parameters (e.g., active time, amount of current during use, etc.) and/or temperature readings, may be collected over time (or input as a set of instructions) and stored on a memory accessible to a processor/control circuitry 56 associated with the power supply 10 and/or control circuitry 34 on wire feeder 12. In such a case, the control circuitry can employ stored information (e.g., associated with a desired cooling profile, including historical data), and/or customizable information input by an operator (e.g., via an interface 58) to route compressed air through one or more cooling channels.

For example, a memory device may store processor executable instructions (e.g., firmware or software) for the control circuitry 34 or control circuitry 56 to execute. One or more lists or look up tables may be provided, and/or network connections to various databases available to inform decision-making, such as to access preferred channels to provide optimum cooling for a given component, for a particular operation or parameter, etc.

FIG. 3 shows a flowchart representative of example machine readable instructions 101 which may be executed by the control circuitry 34 or 56 of FIGS. 1 and 2 f to provide compressed air cooling in a welding type system. At block 102, the system is controlled to operate in a gouging mode (such as via selector 20, in response to a user input, and/or from a program sequencer). At block 104, the control circuitry receives signals from one or more sensors (e.g., sensors 76) corresponding to a temperature of a component (e.g., power conversion circuitry 38). In block 106, a temperature value or change in temperature value is compared to one or more threshold temperature values or change in values (e.g., stored in memory of control circuitry 34, 56). If the value or change in value does not exceed a first threshold value at block 108, the method returns to block 104 to continue to receive sensor data.

If the value or change in value does exceed the first threshold value at block 108, the method proceeds to block 110 to open a valve (e.g., valve 74) to route the compressed air through a corresponding cooling channel (e.g., cooling channel 72).

At block 112, the control circuitry continues to monitor the sensor output and at block 114 a temperature value or change in temperature value is compared to the first threshold temperature value or change in value (or a second threshold value or change in value). If the value or change in value has not fallen below the first threshold value at block 116, the method returns to block 112 to continue to receive sensor data. If the value or change in value does fall below the first threshold value at block 116, the method proceeds to block 118 to close the valve to prevent the compressed air being routed through the corresponding cooling channel. The method then returns to block 102 to continue to operate in a gouging mode.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system comprising:
   one or more channels within the welding system to convey compressed air from a compressed air source;
   a compressed air outlet to provide compressed air through the one or more channels to a gouging torch; and
   a cooling pathway to route compressed air through the one or more channels to a component within the welding system, wherein conveyance of the compressed air draws heat from the component, wherein the welding system is configured to operate in a gouging mode and an arc welding mode, the compressed air source configured to activate in the gouging mode and deactivate in the arc welding mode.

2. The system as defined in claim 1, wherein the one or more channels comprise a conductive material.

3. The system as defined in claim 2, wherein the conductive material is one of a metal or a semiconductor.

4. The system as defined in claim 1, wherein the one or more channels comprise one or more of a flexible conduit or a rigid conduit.

5. The system as defined in claim 1, further comprising one or more valves to selectively control conveyance of the compressed air to the one or more channels.

6. The system as defined in claim 1, further comprising one or more temperature sensors to monitor temperature of the component.

7. The system as defined in claim 1, wherein the component comprises one or more of a power conversion circuitry or a control circuitry.

8. The system as defined in claim 1, wherein the welding system comprises a welding power source or a wire feeder.

9. The system as defined in claim 1, wherein the compressed air source is an air compressor.

10. The system as defined in claim 1, wherein the one or more channels are located within a housing of the welding system.

11. A wire feeder comprising:
one or more channels within the wire feeder to convey compressed air from a compressed air source;
a compressed air outlet to provide compressed air through the one or more channels to a gouging torch;
a cooling pathway to route compressed air through the one or more channels to a component within the wire feeder, wherein conveyance of the compressed air draws heat from the component; and
one or more valves to selectively control conveyance of the compressed air to the one or more channels; and
a control circuitry configured to:
receive signals from one or more sensors corresponding to a temperature of the component;
control the one or more valves to open to route compressed air to the component when the temperature has exceeded a first threshold temperature value; and
control the one or more valves to close to prevent compressed air being routed to the component when the temperature is below the first threshold temperature value.

12. The wire feeder as defined in claim 11, wherein the one or more sensors are located on or near the component within the wire feeder.

13. The wire feeder as defined in claim 11, wherein the torch comprises a selector to control flow of compressed air to the torch.

14. The wire feeder as defined in claim 11, further comprising a welding cable connecting the torch to the wire feeder, the welding cable to convey one or more of arc welding power, gouging power, compressed air, electrode wire, shielding gas, or control signals.

15. The wire feeder as defined in claim 11, wherein the compressed air source is an air compressor.

16. The wire feeder as defined in claim 11, wherein the one or more channels comprise a conductive material.

17. The wire feeder as defined in claim 11, wherein the one or more channels comprise one or more of a flexible conduit or a rigid conduit.

18. A welding system comprising:
one or more channels within the welding system to convey compressed air from a compressed air source;
a compressed air outlet to provide compressed air through the one or more channels to a gouging torch; and
a cooling pathway to route compressed air through the one or more channels to one or more components within the welding system,
a control circuitry configured to:
receive signals from one or more sensors corresponding to a gouging mode and an arc welding mode;
control one or more valves to open to route compressed air to the one or more channels in response to activation of the gouging mode; and
control the one or more valves to close to prevent compressed air being routed to the one or more channels in the arc welding mode.

19. The welding system as defined in claim 18, wherein the one or more sensors are located on or near the component within the welding system.

20. The welding system as defined in claim 18, wherein the gouging torch comprises a selector to control flow of compressed air to the gouging torch.

* * * * *